United States Patent

Ahy

[15] 3,643,963

[45] Feb. 22, 1972

[54] SIGNAL RECORDING AND/OR PLAYBACK APPARATUS

[72] Inventor: Jahangir Madjidi Ahy, 13 Duke St., Manchester Square, London, W. 1, England

[22] Filed: Apr. 28, 1969

[21] Appl. No.: 819,862

[30] Foreign Application Priority Data

Apr. 30, 1968 Great Britain ....................20,507/68
Apr. 30, 1968 Great Britain ....................20,509/68

[52] U.S. Cl. ....................274/4 J, 274/11 E
[51] Int. Cl. ....................G11b 5/00
[58] Field of Search ....................274/4, 11, 17, 20–22

[56] References Cited

UNITED STATES PATENTS 2,168,792 8/1939 Daniel ....................274/11
2,294,854 9/1942 Steed ....................274/11
2,417,651 3/1947 Kuhlik ....................274/11
2,730,369 1/1956 Steed ....................274/11 X

FOREIGN PATENTS OR APPLICATIONS 789,085 1/1958 Great Britain ....................274/11

*Primary Examiner*—Harry N. Haroian
*Attorney*—Holcombe, Wetherill & Brisebois

[57] ABSTRACT

This specification describes a signal recording and/or playback apparatus for recording signals on a broad record band in a plurality of parallel tracks or track sections and/or for playing back signals so recorded. The apparatus described includes a transducer head which is driven across the record band in a series of steps, means being provided which ensure that each step corresponds to the spacing between two tracks or track sections. The apparatus described also includes a position indicator for indicating the position of the transducer head along the length of the band. This counter is reset to zero by means adapted to be actuated by trigger means provided on the band at a position corresponding to the ends of the tracks or track sections in which said signals are recorded or to be recorded. In a modification, two transducer heads are provided which are rendered operative during alternate periods, each of said heads being shifted to another track while it is inoperative.

9 Claims, 6 Drawing Figures

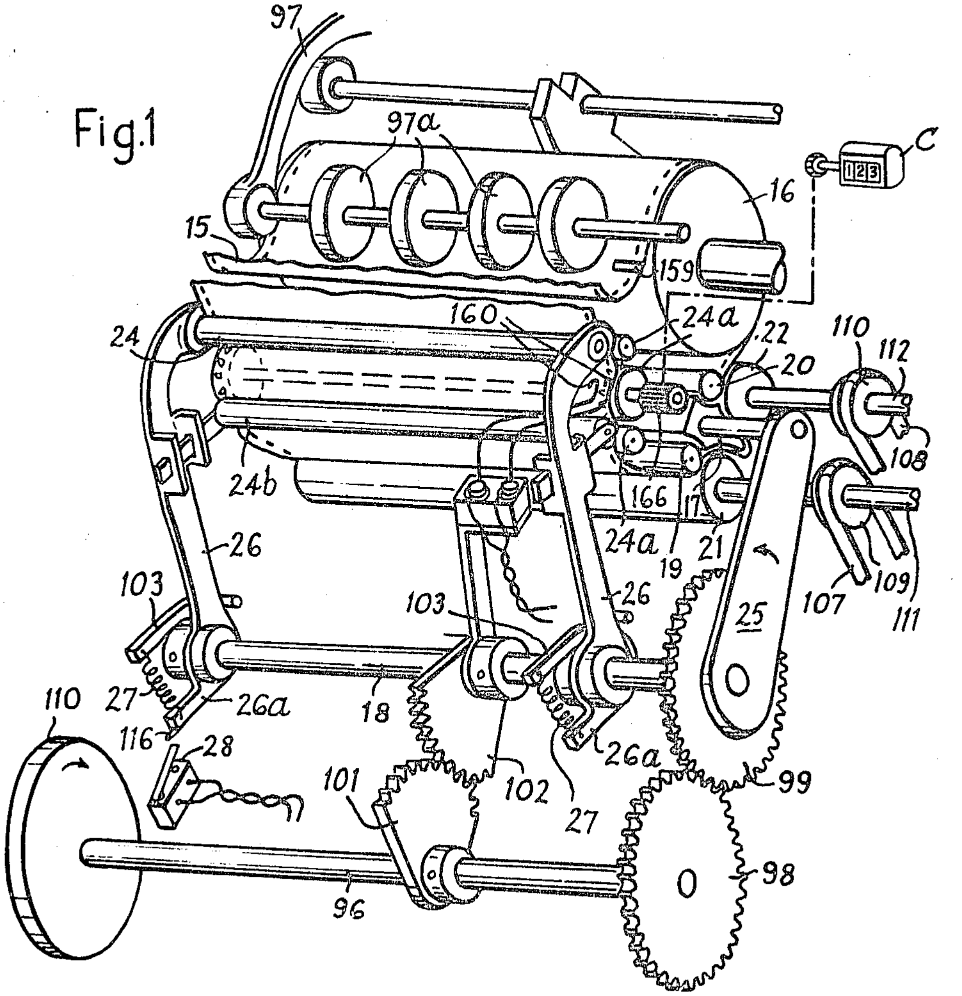
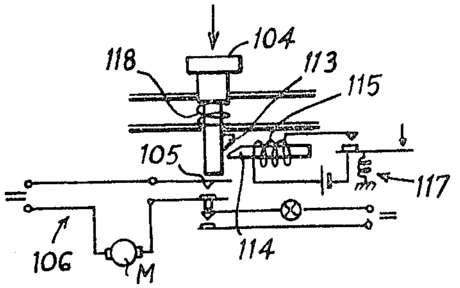
Fig.3
Fig.4
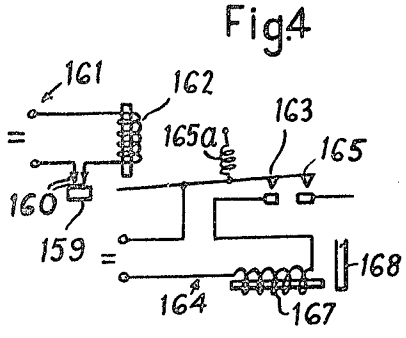

SIGNAL RECORDING AND/OR PLAYBACK APPARATUS

This invention relates to signal recording and/or playback apparatus in which the signals, are recorded magnetically, mechanically or optically on a broad record band in a plurality of spaced-parallel tracks or track sections. More particularly the invention relates to improvements in or modifications of signal recording and/or playback apparatus as described and illustrated in the specification of my U.S. Pat. application Ser. No. 661,631.

The above-mentioned United States application describes a signal recording and/or playback apparatus comprising a wide band record in the form of an endless loop which is inserted into the apparatus wound up in double spiral form and, during use, is stored in a storage compartment in a random fashion, drive rollers positioned respectively adjacent opposite sides of the opening of said compartment through which the band can be withdrawn from and fed into the compartment, a capstan for advancing the band passed a transducer head, a movable feeder member carrying counter rollers adapted to cooperate with said drive rollers respectively, and being movable from a first position in which said counter rollers are spaced from said drive rollers and the feeder member is located within a loop of band at the free end of the spirally wound-up band which also passes around said capstan to a second position in which said counter rollers are urged towards their associated drive rollers respectively with the band gripped therebetween, and means for selectively driving both said drive rollers in opposite directions towards the opening to feed the band through the opening and into the random storage compartment and for driving one of said rollers towards said opening and at least the other drive roller or said capstan in the direction to withdraw the band from said compartment to circulate it passed the transducer head.

From one aspect, the invention is particularly concerned with recording and/or playback apparatus which uses endless or nonendless record bands having a plurality of parallel track sections arranged side-by-side parallel to the length of the band, and consists in such a signal recording and/or playback apparatus including drive means for traversing the transducer head of the apparatus across the track sections of a band inserted in the apparatus and means associated therewith which ensures that at the completion of any such traverse the head has moved by a predetermined distance or a whole number multiple of that distance. This predetermined distance, which may be adjustable, will be the distance between the tracks sections on the record band with which the apparatus is intended to be used.

Preferably, the drive means for traversing the transducer head across the band is operated electrically and said associated means prevents the drive operating circuit from being broken except at predetermined intervals corresponding to a movement of the transducer head by said predetermined distance. In a preferred embodiment, the drive means for the transducer head is clutched in by a relay in the drive operating circuit and a notched cam roller driven by said drive means operates an electric switch, in an auxiliary drive operating circuit, which has a pusher running on the surface of the cam roller and is closed thereby except when the pusher drops into the notch in the cam roller, each turn of the cam roller corresponding to a movement of the transducer head through said predetermined distance.

In order to traverse the transducer head from one track to the next of a record band inserted in the apparatus, after the completion of the playing or recording of a track section, an electric switch is provided which is closed by means provided on the band, at a position corresponding to the ends of the track sections on the band, causing momentary completion of the operating circuit for the transducer head drive means. The traverse is then completed by means of said associated means.

The invention also consists in a signal recording and/or playback apparatus in which an electric circuit when completed by trigger means provided on a broad band record, having a plurality of spaced-parallel track sections arranged side-by-side parallel to the length of the belt, inserted in the apparatus, at a position corresponding to the ends of the track sections thereon, initiates the operation of drive means for traversing the transducer head of the apparatus across the band, said drive means actuating means which maintain the operation of said drive means only until the transducer head has moved a distance corresponding to the spacing between two tracks sections.

Means may also be provided for traversing the head manually. Further, a position counter may be provided to indicate the track with which the transducer head is aligned.

A position counter may also be provided for indicating the position of the transducer head along the length of the record band. This counter is preferably reset to zero at the end of the playing or recording of each track section by the trigger means on the band.

Thus, from another aspect, the invention consists in a signal recording and/or playback apparatus for a broad band record having a plurality of spaced-parallel tracks thereon, in which means for resetting to zero a position indicator for indicating the position of the transducer head of the apparatus along the length of a band inserted in the apparatus, is actuated by trigger means provided on the band at a position corresponding to the ends of the track sections on the band. Such apparatus may be used with a record band having a single, continuous helical track inclined slightly to the length of the record band.

Preferably the means for resetting the counter to zero is electrically operated, advantageously by means of the same circuit which initiates the operation of the drive means for the transducer head for traversing the latter across the band by one track as described above.

In order to obtain continuous reproduction from broad record bands, endless bands have been used which have either had the signals recorded on them in track sections arranged side-by-side parallel to the length of the band with the track sections interconnected by inclined sections at one zone of the band, or along a continuous helical track.

In a modification of this invention, the apparatus comprises at least two transducer heads, means for rendering said heads operative during alternate periods and drive means for shifting each of said heads to another track while it is inoperative. An advantage of this modification is that continuous reproduction can be obtained while recording the signals in separate tracks arranged parallel to the length of the band and thus the preparation of copies or duplicates from a master band as proposed in my British Pat. No. 1104251 is simplified.

In order that the invention may be more readily understood, reference will now be made to the accompanying drawings which show in greater detail parts of the recording and/or playback apparatus described and illustrated in the specification and drawings of my U.S. Pat. application Ser. No. 661,631, like reference numerals being used for like parts described therein and also illustrated in the accompanying drawings, in which:

FIGS. 1 and 2 show views from opposite sides of the capstan, FIG. 1 illustrating particularly the control and feed mechanism for the record band and FIG. 2 illustrating particularly the mechanism for effecting and controlling traversing of the transducer head across the record band.

FIGS. 3 and 4 show electric circuits associated with these mechanisms,

Figure 2:
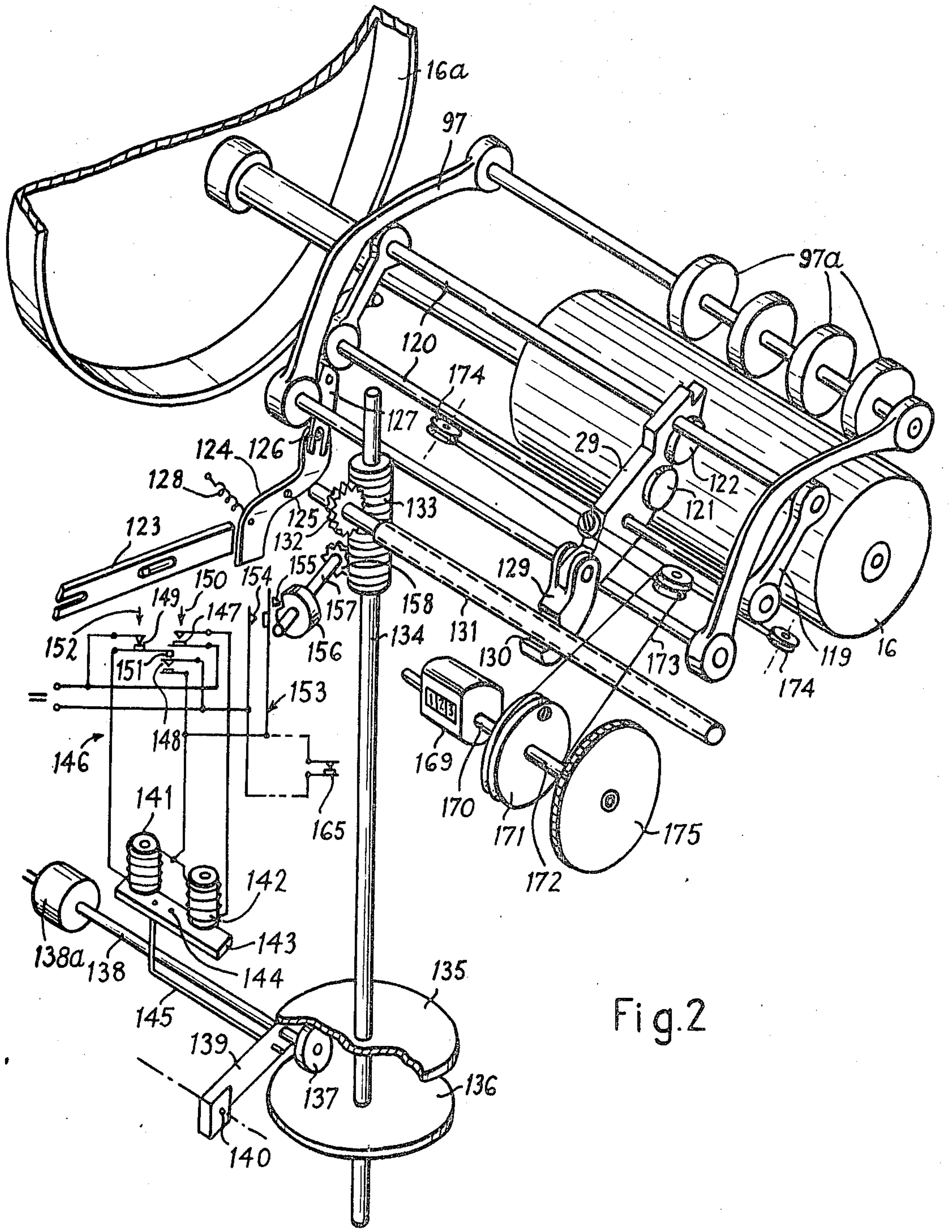

As described and illustrated in the specification and drawings of my U.S. Pat. application Ser. No. 661,631 an endless broad magnetic record band 15 on which the signals are magnetically recorded in a plurality of spaced-parallel tracks arranged side-by-side parallel to the length of the band, is unwound from a spool (not shown), on which the band is initially wound in double spiral form. The record band is fed around a capstan 16, drive rollers 21 and 22 and guide rollers 24*a*. A frame 97 carries rollers 97*a* movable towards and away from the capstan 16, which hold the record band against the capstan. A part of the band is stored in a random storage compartment (not shown) beneath the drive rollers 21 and 22. As shown, one of the rollers 24*a* is sprocketed for accurately controlling the movement of the band 15. A flywheel 16*a* is mounted on the spindle of the capstan 16. A takeup roller (not shown) may also be provided for an isolating band (also not shown) arranged between the magnetically coated surfaces of the magnetic band which would otherwise come into contact when the band is wound up on the spool. The feeder member 17 operates as described in said specification and the operation of the apparatus is generally as described therein.

The control roller 24 and a roller 24*b* are carried on two arms 26 mounted on pivot bar 18. The rollers 24 and 24*b* are moved into engagement with the band 15 to press the band against the rollers 24*a* by a handwheel 100 through quadrant gears 101 and 102 fixed on the spindle 96 of the handwheel and the pivot bar 18 respectively. The handwheel 100 also swings the feeder member 17, mounted on arm 25 fixed to the pivot bar 18, from its inoperative position to its feed position shown through toothed wheels 98, 99 fixed on the spindle 96 and the pivot bar 18 respectively. The arms 26 carrying roller 24 are freely rotatably mounted on the pivot bar 18 and in the position shown urge the roller 24 towards the rollers 24*a* by means of springs 27 connected between extensions 26*a* of the arms 26 and arms 103 nonrotatably mounted on the pivot bar 18.

For unwinding the band 15 from the spool prior to recording or playback, an electric drive motor M is started by pressing a push button 104 which closes a switch 105 in motor circuit 106. The motor M drives the rollers 21, 22 in opposite directions via belts 107, 108 and pulleys 109, 110 mounted on the axes 111, 112 of the drive rollers. During this movement the spool runs freely. A lug 113 on the pushbutton 104 engages behind the plunger 114 of a solenoid 115 to keep the switch 105 closed. When the band 15 is fully unwound it becomes taut and pulls the control roller 24 away from rollers 24*a*, although the band is still held against the sprocketed roller 24*a*. A pusher 116 on an extension 26*a* of one of the arms 26 closes switch 28 and as shown in FIG. 3 completes the circuit 117 containing the solenoid 115 thus withdrawing the plunger 114 from engagement with the lug 113 of the pushbutton 104. The pushbutton 104 is moved to the release position by a spring 118 and breaks the circuit 117 stopping the rollers 21 and 22.

In order to reactivate the motor for driving the drive rollers 21 and 22 in the same direction to feed the band 15 past the transducer head 29 (FIG. 2) for recording or playback, another circuit (not illustrated) is closed by a separate pushbutton (also not shown).

Referring now to FIG. 2, the transducer head 29 is mounted for sliding movement along a frame 119 which is pivotable about the lower of the two slide bars 120 thereof for moving the record and playback transducers 121, 122 carried on the head 29 towards and away from capstan 16. The pivotal movement of the frame 119 is effected by a push bar 123 which acts on a lever 124, pivotably mounted at 125 and which has at its end remote from the push bar a stud 126 engaging in the bifurcated end of an arm 127 fixed to the frame 119. When the bar 123 is pushed against the end of the lever 124, the transducers 121, 122 are pushed towards the capstan 16 and when the push bar is retracted, a spring 128 connected to the lever 24 urges the frame 119, and thus the transducer head 29, away from the capstan.

The transducer head 29 may be moved along the slide bars 120 of the frame 119 either manually or automatically.

The head 29 has pivoted thereto an arm 129 having a screw-threaded surface 130 which is held in engagement with a screw-threaded rod 131 extending across the width of the capstan 16. At one end, the rod 131 carries a sprocket 132 which engages with a worm gear 133 carried on the upper end of a vertical spindle 134, which carries two spaced discs 135, 136 at its lower end. The spindle 134 may be driven clockwise or anticlockwise by a roller 137 selectively engageable with the discs 135, 136. The roller 137 is mounted on the end of a continuously rotating spindle 138, driven by the motor M, which is carried by an arm 139 pivoted at 140. The roller 137 is brought into engagement with one or other of the discs 135, 136, by energizing relays 141, 142 respectively, as described below. When the relay 141 is energized, a lever 143 is pivoted about is fulcrum 144 to lift the roller 137, by means of a rod 145 connecting the lever 143 with the arm 139 thus bringing the roller 137 into engagement with the upper disc 135. Consequently, the transducer head 29 is moved along the slide bars 120 of the frame 119 in one direction, say left to right. By energizing the relay 142, the roller 137 is brought into engagement with the lower disc 136 so that the head 29 is moved along the slide bars 120 in the opposite direction. When neither of the relays is energized, the roller 137 is supported out of engagement with both discs 135, 136 and the head 29 is stationary. The speed of the drive may be adjusted by means of a connection 138*a* in the spindle 138 which enables the length of the latter to be adjusted.

The relays 141, 142 are connected in a circuit 146 containing switches 147, 148 which are normally open and switch 149 which is normally closed. The part of the circuit for energizing relay 141 is completed by a pushbutton shown diagrammatically at 150 which pushes against switch 147 and thus, by means of a pusher 151, closes switch 148, switch 149 being opened at the same time so that the part of the circuit for the relay 142 is open. The part of the circuit for energizing the relay 142 is completed by another pushbutton shown diagrammatically at 152 which presses against switch 149 and by means of the pusher 15 also closes the switch 148, the switch 147 remaining open so that the circuit for relay 141 is incomplete.

In order to ensure that the head always finishes a movement with the transducers 121, 122 aligned with a track section of the record band 15, the circuit 146 includes an auxiliary circuit 153. The circuit 153 includes a switch 154 operated by a pusher 155 carried thereon running on a notched cam roller 156. The cam roller 156 is mounted on a spindle 157 carrying a sprocket 158 engaging with the worm gear 133 on the spindle 134. The sprocket 158 has eight teeth while the sprocket 132 on the threaded rod 131 has 16 teeth. For each half turn of the rod 131, the head 29 moves along the frame 119 by one track of the record band 15. Thus each turn of the cam roller 156 corresponds to a movement of the head by one track. It will be seen that if, when either of the pushbuttons 150, 152 is released after a desired movement of the head along the frame 119 and the lug 155 of switch 154 is not in the notch of the cam roller 156, the switch 154 will be closed. Closing of this switch completes the circuit for the relay 141 when the pushbuttons 150 and 152 are released so that the head is moved along the frame 119 from left to right by the roller 137 engaging disc 135 until the pusher 155 drops in the notch in the cam roller 156. Since one turn of the cam roller 156 corresponds to a movement of the head by one track, the transducers 121, 122 are always aligned with a track of the record band 15 when the pusher 155 is in the notch of the cam roller 156. Thus, at the completion of any traverse of the head, the transducers 121, 122 are aligned with a track of the record band.

Means are also provided for shifting the head 29 across the record band to the next track after recording or playback along each track is finished. As shown in FIG. 1, the record band 15 carries a metal contact 159 located at a position corresponding to the ends of the tracks on the band. When the contact 159 touches two contacts 160 carried by the apparatus, adjacent the band path, the circuit 161 shown in FIG. 4 is completed, energizing relay 162 which closes a switch 163 in a circuit 164 actuating means for resetting a position counter C for indicating the position of the position of the head 29 along a track. The relay 162 also closes a switch 165 in the circuit 146 (FIG. 2) by which the relay 141 is energized, causing the head 29 to move from left to right along the band. The cam roller 156 immediately closes the switch 154 so that when the contact 159 has passed the contacts 160 allowing the switch 165 to be opened by a spring 165*a*, the relay is maintained energized until the pusher 155 of switch 154 drops into the notch in the cam roller, when the transducer head has moved along the record band 15 by one track. This is repeated each time a track is finished.

The threaded rod 131 is adjustable axially along its spindle to enable the transducer head to be aligned with a track on the band 15 at the start of a playback operation without disturbing the sprocket 132.

The position counter C referred to above for indicating the position of the head 29 along a track is operated through a toothed wheel 166 on the sprocketed roller 24*a* (see FIG. 1). At the end of each track the counter is reset to zero. This is effected by completion of the circuit 164 as described above. When the circuit 164 is completed a relay 167 is energized which, through lever 168 and means not shown, resets the counter to zero.

A counter 169 (FIG. 2) is also provided for indicating the position of the head 29 across the band 15. This counter is triggered through a spindle 170 and a gear (not visible) by a spindle 172 carrying a pulley 171 around which passes a string 173, also passing around pulleys 174 and having its ends connected to the head 29. As the head 29 moves across the band 15, the pulley 171 is rotated and the counter 169 is triggered each time the head is shifted across the record band by one track.

The transducer head 29 may be moved manually across the band, the arm 129 being pushed out of engagement with the threaded rod 131, by a handwheel 175 fixed to the spindle 172.

Figure 5:
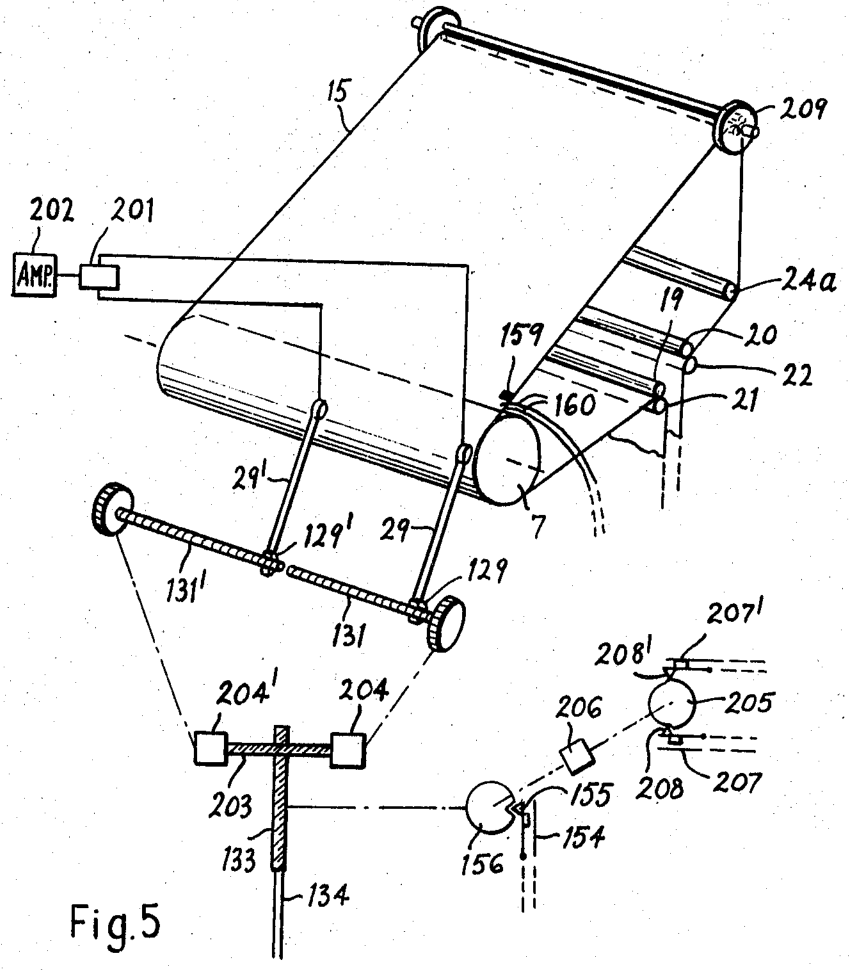
FIG. 5 shows, schematically, a perspective view of a modified form of the apparatus having two transducer heads.
Figure 6:
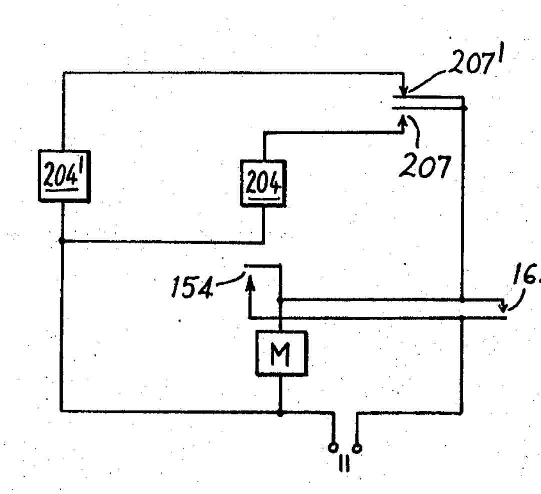
FIG. 6 shows an electric circuit associated with the drive mechanism for the transducer heads.

In a modification shown in FIGS. 5 and 6, two transducer heads 29, 29' are provided which are rendered operative during alternate periods to record or play back along one track of the band 15 during each period. While it is inoperative and the other head is recording or playing back along a track, each head is shifted transversely across the band to the next track it is to scan. As illustrated, the head 29 scans tracks across one-half of the width of the band 15 while the head 29' scans tracks across the other half of the band.

In order to operate the transducer heads during alternate periods, the operating circuit for the transducer heads 29, 29' includes a changeover switch or fader 201 between the transducers and amplifier 202. This switch 201 is actuated by the contact 159 on the band 15 touching the contacts 160. Also, as in the embodiment illustrated in FIGS. 1 to 4, when the contact 159 touches the contacts 160, the drive for the transducer heads 29, 29' is also actuated.

In this modification, two threaded rods 131, 131' are provided for the transducer heads 29, 29' respectively, each rod being rotatable to drive its associated transducer head through a drive nut 129 or 129'. The rods 131, 131' are driven by a threaded rod 203 through magnetic clutches 204, 204' respectively. The threaded rod 203 is itself driven by the worm 133 on spindle 134. The notched cam wheel 156 is driven by the worm 133 as described hereinbefore and a further cam wheel 205 is driven by the cam 156 through 2:1 reduction gear 206. The cam 205, which is raised along half its circumference, operates two switches 207, 207' in the drive operating circuit for the transducer heads which is shown in simplified form in FIG. 6. When the switch 207 is closed, the circuit to the clutch 204 is completed and when the switch 207' is closed, the circuit to the clutch 204' is completed. The switches 207, 207' are provided with followers 208, 208' respectively which run on the surface of the cam 205. These followers are arranged diametrically opposite on the cam so that when one of the switches 207, 207' is closed the other is open.

When a record band inserted in the apparatus on a spool 209 is to be recorded on or played back, the transducer heads 29, 29' are brought to the positions shown in the drawing in which the head 29 is aligned with the first track along which signals are to be recorded or played back thereby while the head 29' is aligned with the next track preceding the first track it is to scan. The band 15 is then advanced passed the transducer heads 29, 29' and when the contact 159 on the band closes the contacts 160, the head 29 is switched in to record or playback by the switch 201. Simultaneously the switch 165 in the drive operating circuit for the transducer heads is closed and the drive circuit is momentarily completed, causing the threaded rod 203 to be rotated. At the same time the clutch 204' is engaged since the follower 208' of switch 207' is on the raised part of the cam 205. Thus, the threaded rod 131' is rotated and a traverse of the transducer head 29' is initiated. During this momentary completion of the drive circuit, the follower 155 rides out of the notch in the cam 156 and closes the switch 154 so that, in the manner described hereinbefore, the drive for the transducer head 29' is maintained until it has moved across the band by one track spacing whereupon the follower 155 again drops into the notch in the cam 156 and the drive circuit is broken. When the drive circuit is broken, the follower 208' has reached the end of the raised part of the cam 205. The head 29' is now ready to scan along its first track.

The next time the contacts 160 are closed by the contact 159, the head 29 is switched out of the operating circuit and the head 29' is switched in. At the same time the transducer heads drive circuit is momentarily completed and then held as described above. This time, however, the follower 208 runs on the raised part of the cam 205 so that the clutch 204 is engaged and the transducer head 29 is shifted transversely across the band to the next track which it is to scan. This operation is repeated at the end of the playing back or recording of each track so that the heads 29, 29' are rendered operative alternately and each head is shifted to the next adjacent track while it is inoperative.

It will be appreciated that various modifications may be made to the specific details referred to herein without departing from the scope of the invention. For example the mechanisms described herein for effecting and controlling the traverses of the head or heads across the band and for resetting to zero the position counter indicating the position of the head along the length of the band may be used in an apparatus which uses record bands which are not endless, the motion of the record band being reversed each time a track has been played or recorded after the transducer head has been shifted by one track.

Further, in the embodiment illustrated in FIGS. 5 and 6, the transducer heads may each be moved away from the band while being shifted to the next track. In this case a single-threaded rod 131 may be used, the drive nuts 129, 129' engaging this rod only when the associated head is away from the band. The clutches 204, 204' and the cam 205 are then unnecessary.

I claim:

1. A signal recording and/or playback apparatus for recording signals on a broad record band in a plurality of parallel tracks or track sections arranged side-by-side parallel to the length of the band and/or for playing back signals so recorded, said apparatus including at least two transducer heads, means for rendering said heads operative during alternate periods, drive means for traversing each of said transducer heads transversely across a band inserted in the apparatus from one track to another while it is inoperative, means for initiating the operation of the drive means and means associated with said drive means to stop said drive means only when the head has moved by a whole number multiple of a predetermined distance.

2. Apparatus as claimed in claim 1, wherein the drive means for traversing each said transducer head is operated electrically and is clutched in upon actuation of a relay in a drive operating circuit by said initiating means, and a cam driven by said drive means closes a holding circuit which maintains the operation of said drive means until the transducer head has moved by said predetermined distance.

3. Apparatus as claimed in claim 1, wherein a position counter is provided for indicating the position of the transducer heads along the length of the record band, said counter being reset to zero at the end of the playing or recording of each track or track section.

4. Apparatus as claimed in claim 2, wherein the operation of said drive means is initiated by the closure of an electric switch by trigger means provided on the band at a position corresponding to the ends of the tracks or track sections along which signals are recorded or to be recorded.

5. Apparatus as claimed in claim 4, wherein the closure of said electric switch causes momentary completion of the operating circuit for the transducer head drive means and the traverse of the transducer head is completed by said associated means.

6. Apparatus as claimed in claim 4, wherein a position counter is provided for indicating the position of the transducer heads along the length of the record band, and the closure of said electric switch also actuates means for resetting the counter to zero at the end of the playing or recording of each track or track section.

7. Apparatus as claimed in claim 1, in which means for resetting to zero a position indicator for indicating the position of the transducer heads along the length of the band, is actuated by trigger means provided on the band at a position corresponding to the ends of the tracks or track sections in which said signals are recorded or are to be recorded.

8. Apparatus as claimed in claim 6, wherein the drive means for traversing the transducer heads transversely across the band includes: an axially adjustable, rotatable, threaded rod for each transducer head, each said rod extending in a direction across the band and cooperating with a drive nut associated with the associated transducer head, and a reversing drive comprising a pair of spaced apart discs mounted on a first spindle and a second, drive, spindle carrying a roller which is selectively engageable with said discs, is normally supported out of engagement with both said discs and is adjustable radially of said discs for varying the speed of traverse of the transducer heads, each said threaded rod being driven via a worm mounted on said first spindle and a worm wheel mounted on said threaded rod, said worm also driving said cam, each turn of which corresponds to a movement of a said transducer head through said predetermined distance.

9. Apparatus as claimed in claim 8, further comprising means adapted to receive a spool on which a record band is wound in double spiral form and having at least two spaced core members about one of which the band is looped, a storage compartment which is adapted to store therein, in a random fashion, a major part of the band, said compartment having an opening through which the band can be withdrawn from and fed into the compartment, drive rollers positioned respectively adjacent opposite sides of said opening, a capstan for advancing the band passed said transducer heads, said transducer heads being mounted on a frame for movement towards and away from the band, a movable feeder member comprising counter rollers adapted to cooperate with said drive rollers respectively, the loop of band at the free end of the spirally wound-up band being looped around said capstan and said feeder member, said feeder member being movable from a first position in which said counter rollers are spaced from said drive rollers to a second position in which said counter rollers are urged towards their associated drive rollers respectively with the band gripped therebetween and traversing said opening, and means for selectively driving both said drive rollers in opposite directions towards the opening to feed the band through the opening and into the random storage compartment, and for driving one of said drive rollers towards said opening and at least one of said other drive roller and capstan in the direction to withdraw the band from said compartment and feed it passed the transducer, means responsive to tension on the band for interrupting the means driving both said drive rollers in opposite directions towards said opening when the spirally wound-up band is fully unwound, and means for selectively driving the spool to wind the band thereon in double spiral form and simultaneously driving both said drive rollers in opposite directions away from said opening to withdraw the band from the random storage compartment as it is being wound-up on the spool, said means responsive to tension on the band also interrupting the means driving both said drive rollers in opposite directions away from said opening when the band, apart from the loop extending around the capstan and feeder member, is rewound on the spool.

* * * * *